(12) United States Patent
Bardon et al.

(10) Patent No.: US 7,547,343 B2
(45) Date of Patent: Jun. 16, 2009

(54) FILTERING STRUCTURE, ESPECIALLY PARTICLE FILTER FOR EXHAUST GASES OF AN INTERNAL COMBUSTION ENGINE, AND ASSOCIATED EXHAUST LINE

(75) Inventors: Sébastien Bardon, Lyons (FR); Nicolas Bonnail, Avignon (FR); Anthony Briot, Avignon (FR); Vincent Gleize, Avignon (FR); Matteo Scalabrino, Avignon (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 297 days.

(21) Appl. No.: 10/597,644

(22) PCT Filed: Feb. 2, 2005

(86) PCT No.: PCT/FR2005/000225

§ 371 (c)(1),
(2), (4) Date: Nov. 14, 2006

(87) PCT Pub. No.: WO2005/084782

PCT Pub. Date: Sep. 15, 2005

(65) Prior Publication Data

US 2008/0141634 A1 Jun. 19, 2008

(30) Foreign Application Priority Data

Feb. 4, 2004 (FR) .................................. 04 01077

(51) Int. Cl.
*B01D 39/20* (2006.01)
*B01D 46/00* (2006.01)

(52) U.S. Cl. .......................... 55/523; 55/385.3; 55/483; 55/484; 55/524; 55/DIG. 30

(58) Field of Classification Search ................ 55/282.3, 55/385.3, 484, 523, 524, DIG. 30, 483, DIG. 10; 60/297, 311; 422/177, 179; 428/116

See application file for complete search history.

(56) References Cited

U.S. PATENT DOCUMENTS

| 4,335,783 | A | * | 6/1982 | McBrayer et al. ............... 165/8 |
| 6,797,666 | B2 | * | 9/2004 | Harada et al. ................ 502/180 |
| 6,942,712 | B2 | * | 9/2005 | Hamanaka et al. ............. 55/523 |

(Continued)

FOREIGN PATENT DOCUMENTS

FR 2 833 857 A1 6/2003

*Primary Examiner*—Duane Smith
*Assistant Examiner*—Robert A Clemente
(74) *Attorney, Agent, or Firm*—Sughrue Mion, PLLC

(57) ABSTRACT

This structure comprises first and second filtering elements (15A, 15B) which are respectively provided with a first and a second face (24A, 24B) arranged opposite each other and a seal (17) connecting said faces (24A, 24B). The first face (24A) comprises at least a first region (35A) that does not adhere, or only slightly adheres to said seal (17), opposite a first region (33B) that strongly adheres to said seal (17) of the second face (24B). The first region (35A) that does not adhere or only slightly adheres is delimited by at least a portion of the edge (37) common to the first face (24A) and a discharge face (23). The first region (35A) that does not adhere or only slightly adheres comprises a side (41A) that diverges towards the discharge face (23) and which extends up to said common edge (37).

10 Claims, 10 Drawing Sheets

U.S. PATENT DOCUMENTS

| | | | |
|---|---|---|---|
| 7,214,253 B2 * | 5/2007 | Bardon et al. | 55/523 |
| 7,244,284 B2 * | 7/2007 | Miwa et al. | 55/523 |
| 7,294,316 B2 * | 11/2007 | Harada et al. | 422/180 |
| 2003/0138596 A1 | 7/2003 | Harada et al. | |
| 2006/0191244 A1 * | 8/2006 | Bardon et al. | 55/523 |
| 2007/0059483 A1 * | 3/2007 | Fujita et al. | 428/116 |
| 2007/0095038 A1 * | 5/2007 | Bardon et al. | 55/523 |

* cited by examiner

FILTERING STRUCTURE, ESPECIALLY PARTICLE FILTER FOR EXHAUST GASES OF AN INTERNAL COMBUSTION ENGINE, AND ASSOCIATED EXHAUST LINE

BACKGROUND OF THE INVENTION

The present invention relates to a filtration structure, in particular a particle filter for the exhaust gases of an internal combustion engine, of the type comprising:
- at least first and second filtering elements, each filtering element having an inlet face and a discharge face, connected to each other by at least three lateral faces, said first and second filtering elements having respectively a first and second lateral face arranged opposite each other; and
- a seal connecting said faces and extending between said faces;

the first lateral face comprising at least a first region that does not adhere, or only slightly adheres to said seal, and extends opposite a first region that strongly adheres to said seal of the second lateral face, said first region that does not adhere or only slightly adheres being delimited by at least a portion of the edge common to the first face and the discharge face.

Such structures are used in particular in pollution reduction devices for the exhaust gases of internal combustion engines. These devices includes a silencer comprising in series a catalytic purification means and a particle filter. The catalytic purification means is capable of treating polluting emissions in the gaseous phase, while the particle filter is capable of retaining the soot particles emitted by the engine.

In a known structure of the aforementioned type (FR-A-2 833 857), the filtering elements comprise a set of adjacent conduits with parallel axes, separated by porous filtration walls. These conduits extend between the inlet face for the exhaust gases to be filtered and the discharge face for the filtered exhaust gases. These conduits are also closed at one or other of their ends to delimit inlet chambers opening on the inlet face and discharge chambers opening on the discharge face.

These structures operate in a succession of filtration and regeneration phases. During the filtration phases, the soot particles emitted by the engine are deposited on the walls of the inlet chambers. The loss of pressure through the filter increases progressively. Beyond a predetermined value of this loss of pressure, a regeneration phase is carried out.

During the regeneration phase, the soot particles, basically composed of carbon, are burned on the walls of the inlet chambers, using auxiliary heating means, in order to restore the original properties of the structure.

However, soot combustion in the filter does not occur homogeneously. Combustion begins at the front and in the middle of the filter then spreads. Temperature gradients appear in the filter during the regeneration phases.

The temperature gradients inside the filtration structure produce differing local expansion, and consequently longitudinal and transverse stresses in and/or between the various filtering elements.

These pronounced thermomechanical stresses lead to cracks in the filtering elements and/or in the connecting seals between these filtering elements.

To limit the risk of these cracks appearing, the aforementioned application FR-A-2 833 857 proposes the formation on said first face, in the vicinity of said common edge, of a region that does not adhere, or only slightly adheres to the seal, in particular by application of a non-stick coating in this region.

The presence of this region allows the thermomechanical stresses in the seal to be released, and if these stresses are too great, the spread of any cracks in the seal to be guided along this region.

Such a structure is not completely satisfactory. In fact, after a number of regeneration phases, cracks may also appear inside a filtering element. These cracks spread substantially in a cracking plane that is transverse to the longitudinal direction of this element. If the lateral faces of the filtering elements also comprise regions that do not adhere, or only slightly adhere to the seal in the vicinity of the discharge face, the cracks also spread in these regions.

Because of this, the downstream portion of the filtering element thus delimited between the cracking plane and the discharge face is no longer held by the seal. This downstream portion is therefore likely to become detached from the filtration structure and be carried away in the downstream direction in the discharge line.

SUMMARY OF THE INVENTION

The main object of the invention is to overcome this drawback, in other words to provide a porous filtration structure for particle filters, which maintains mechanical cohesion within the filtering elements.

Accordingly, the invention relates to a filtration structure of the aforementioned type, characterised in that, in an area adjacent to said common edge, said first region that does not adhere, or only slightly adheres to said seal comprises at least one side that diverges towards the discharge face, said side extending as far as said common edge.

The filtration structure according to the invention may comprise one or more of the following characteristics, taken in isolation or in any technically possible combination:
- the rest of said area has, on said first face, a second region that strongly adheres to said seal, said region extending as far as said common edge, and on said first face, a second region that does not adhere, or only slightly adheres to said seal, opposite said second region that strongly adheres to said seal;
- the angle formed by said side and said common edge, is less than or equal to about 50°;
- said first region that does not adhere, or only slightly adheres to said seal extends substantially along the whole length of said common edge;
- said first region that does not adhere, or only slightly adheres to said seal is delimited by a triangle;
- the first lateral face comprises a third region that does not adhere, or only slightly adheres to said seal, distinct from the first region that does not adhere, or only slightly adheres to said seal, delimited at least in part by said common edge and comprising at least one side that diverges towards the discharge face, this side extending as far as said common edge;
- the first face comprises at least a fourth region that does not adhere, or only slightly adheres to said seal, which comprises at least one convergent side, that converges towards the discharge face, the convergent side extending as far as said first region that does not adhere, or only slightly adheres to said seal, said fourth region that does not adhere, or only slightly adheres to said seal being arranged opposite a fourth region that strongly adheres to said seal of the second face; and
- the first filtering element has a third lateral face, arranged opposite a fourth lateral face of a third filtering element, the third lateral face comprising at least a fifth region that strongly adheres to said seal, delimited at least in part by the discharge edge common to the third face and the discharge face, and in an area adjacent to said discharge edge, the fifth region that strongly adheres to said seal comprises at least one side that diverges towards the discharge face, this side extending as far as said discharge edge, the fifth region that strongly adheres to said seal being arranged opposite a fifth region that does not adhere, or only slightly adheres to said seal on said fourth face.

The invention also relates to an exhaust line characterised in that it comprises a structure as defined above.

BRIEF DESCRIPTION OF DRAWINGS

Examples of embodiments of the invention will now be described with reference to the accompanying drawings, in which.

DETAILED DESCRIPTION OF THE INVENTION

Figure 1:
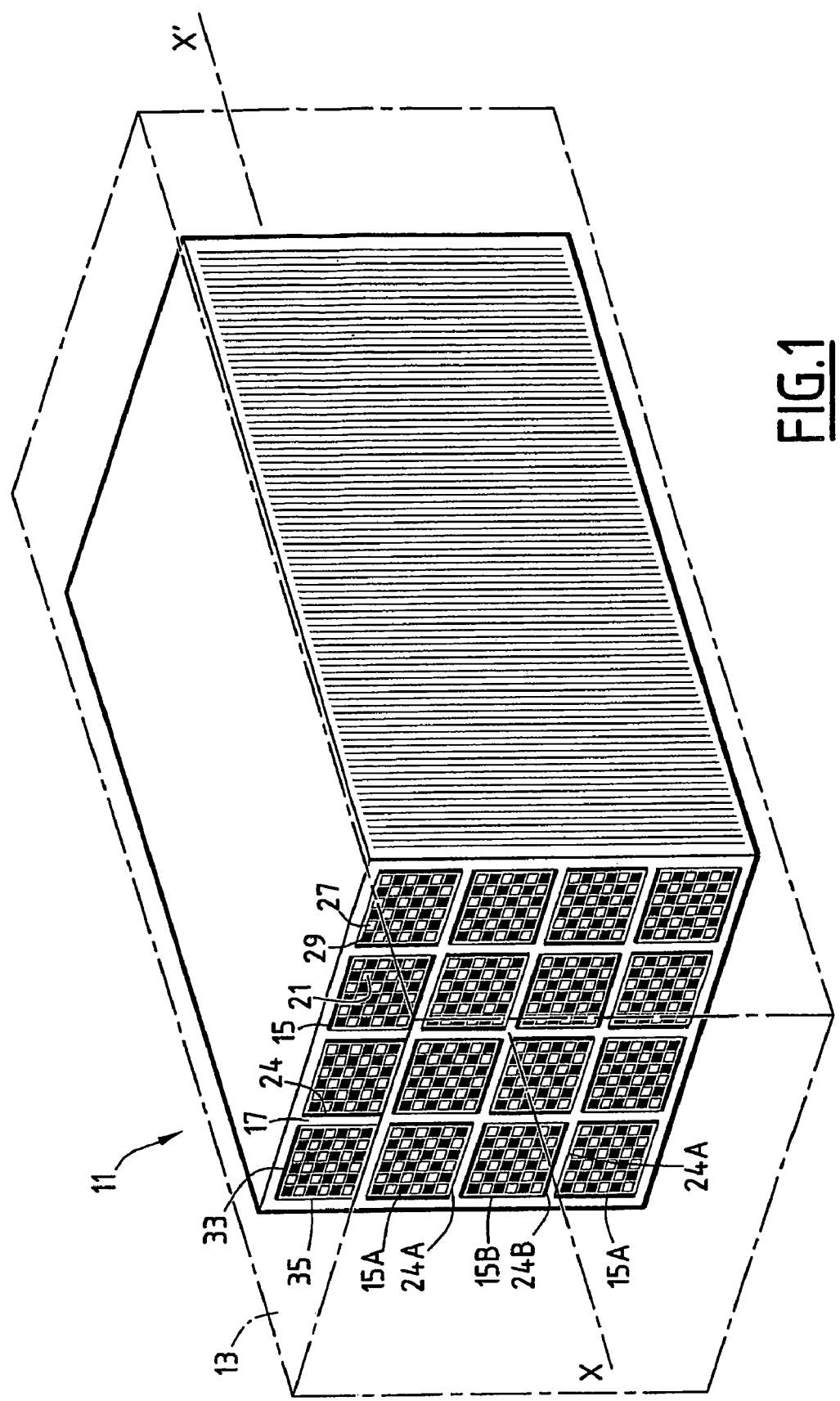
FIG. 1 is a perspective view of a first filtration structure according to the invention.

The particle filter 11 illustrated in FIG. 1 is arranged in an exhaust gas line 13 of a motor vehicle diesel engine, partly illustrated.

This discharge line 13 extends beyond the ends of the particle filter 11 and delimits an exhaust gas circulation passage.

The particle filter 11 extends in a longitudinal exhaust gas circulation direction X-X'. It comprises a plurality of filtration units 15 connected to each other by connection seals 17.

Each filtration unit 15 is of substantially right-angled parallelepiped shape extended in the longitudinal direction X-X'.

The term "filtration unit" designates more generally an assembly comprising an inlet face, a discharge face and at least three lateral faces (four lateral faces in the example illustrated) which connect the inlet face to the discharge face.

Figure 2:
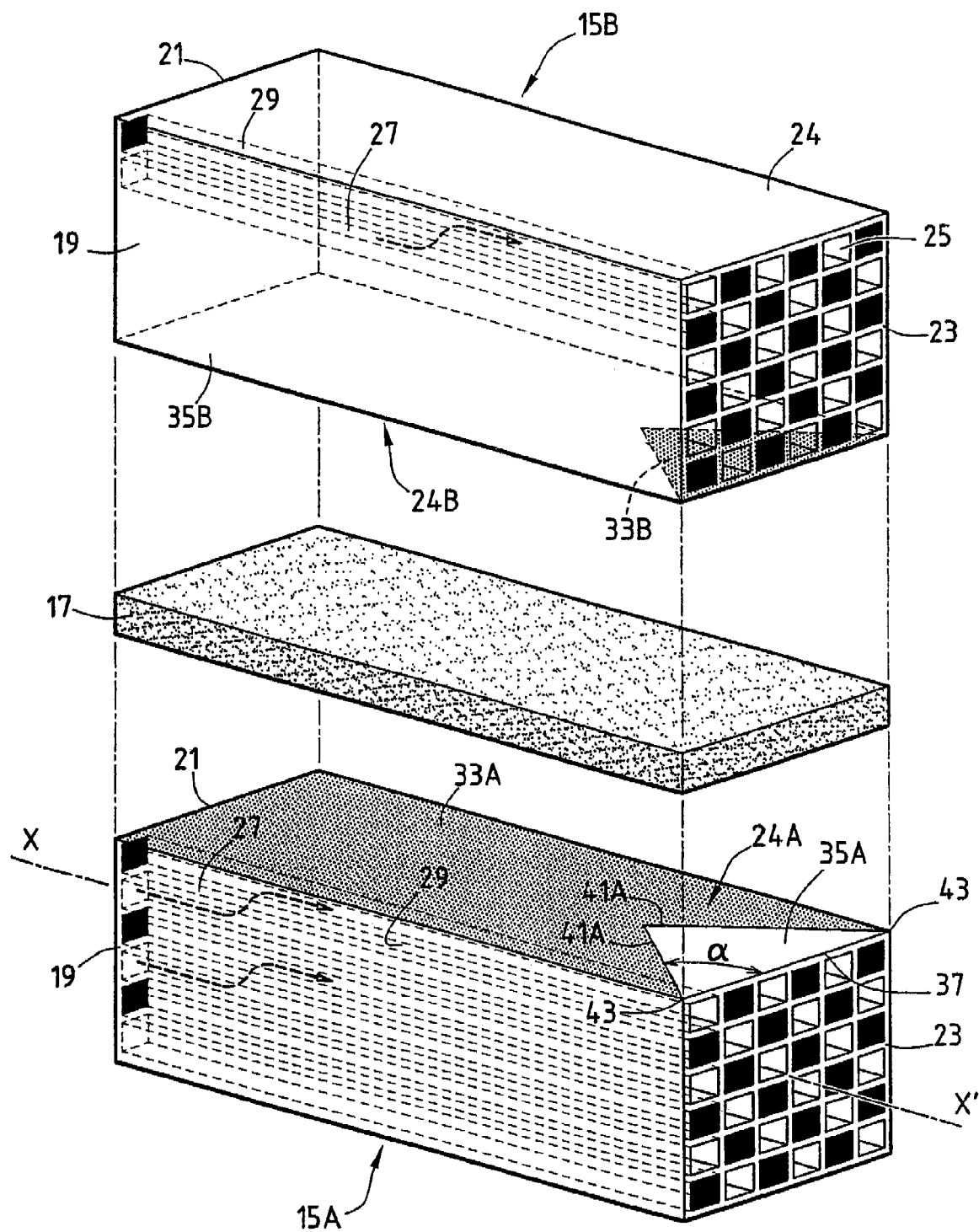
FIG. 2 is a partial exploded perspective view of the filtration structure of FIG. 1.

As illustrated in FIG. 2, each filtration unit 15A, 15B comprises a porous filtration structure 19, an inlet face 21 for the exhaust gases to be filtered, a discharge face 23 for the filtered exhaust gases, and four lateral faces 24.

The porous filtration structure 19 is produced from a filtration material of monolithic structure, in particular from ceramic material (cordierite or silicone carbide), This structure 19 has sufficient porosity to allow the passage of exhaust gases. However, as is known per se, the diameter of the pores is chosen to be small enough to ensure that the soot particles are held.

The porous structure 19 comprises a set of adjacent conduits with axes parallel to the longitudinal direction X-X'. These conduits are separated by porous filtration walls 25. In the example illustrated in FIG. 2, these walls 25 are of constant thickness and extend longitudinally in the filtration structure 19, from the inlet face 21 to the discharge face 23.

The conduits are divided into a first group of inlet conduits 27 and a second group of discharge conduits 29. The inlet conduits 27 and the discharge conduits 29 are arranged head to tail.

The inlet conduits 27 are closed in the region of the discharge face 23 of the filtration unit 15A, 15B and are open at their other end.

Conversely, the discharge conduits 29 are closed in the region of the inlet face 21 of the filtration unit 15A, 15B and open along its discharge face 23.

In the example illustrated in FIG. 1, the inlet 27 and discharge 29 conduits have constant sections along their entire length.

As illustrated in FIG. 2, the mutually facing lateral faces 24A and 24B of the units 15A and 15B are planar.

Figure 3:
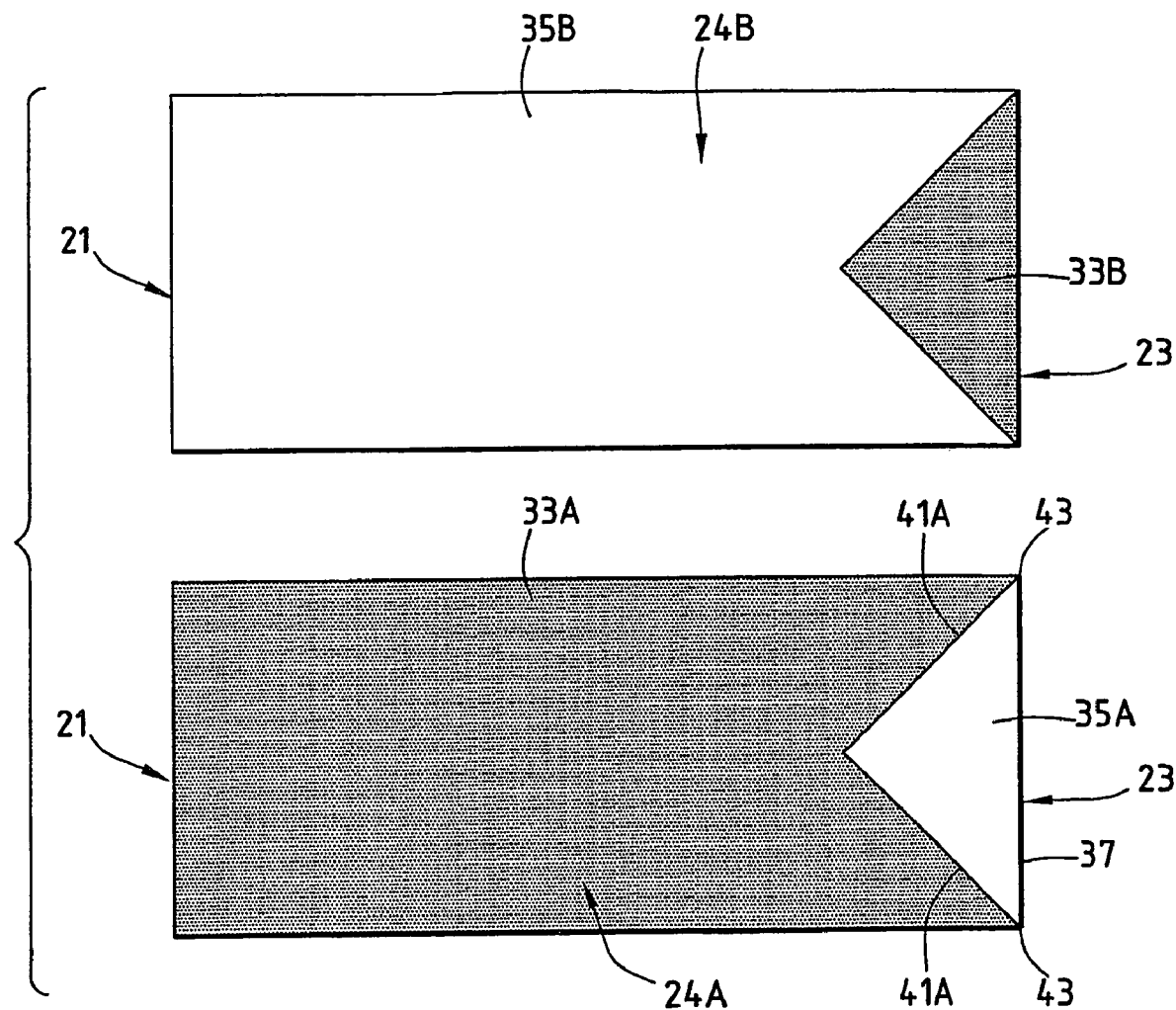
FIG. 3 is a plan view of two faces opposite the filtering elements of FIG. 2.

As illustrated in FIGS. 2 and 3, each planar face 24A and 24B situated opposite another filtration unit comprises at least one region 33 rigidly connected to the seal 17, and at least one region 35 which, during manufacture of the structure 19, is covered with a non-stick coating. This coating is for example based on paper, polytetrafluorethylene, or boron nitride.

Adhesion between the connection seal 17 and the planar faces 24 of the filtration units 15 in the regions 33 that strongly adheres to the seal is at least 10 times greater than that of the regions 35 that do not adhere, or only slightly adhere to the seal 17. Adhesion of the regions 35 that do not adhere, or only slightly adhere to the seal 17 is between 0 and 50 MPa.

Hereinafter, the term "region that strongly adheres" will apply to a region 33 that strongly adheres to the seal 17 and "region that only slightly adheres" will be applied to a region 35 that does not adhere, or only slightly adheres to the seal 17.

The arrangement of the regions 33 and the regions 35 on the planar faces 24 of the filtration units 15 is illustrated in FIGS. 2 and 3.

The first planar face 24A of the first filtration unit 15A comprises a first triangular region 35A that only slightly adheres delimited by the edge 37 common to the discharge face 23 and the first face 24A. This region 35A is also delimited by two sides 41A that diverge towards the discharge face 23, which extend as far as the common edge 37. As illustrated in FIG. 3, the first region that only slightly adheres 35A is thus delimited by an isosceles triangle, the base of this isosceles triangle being formed by the common edge 37.

The angle α formed by each of the sides 41A and the common edge 37 is preferably less than or equal to 50°. In the example illustrated, this angle is equal to 45°.

As illustrated in FIGS. 2 and 3, the first region that only slightly adheres 35A extends opposite a first region 33B that strongly adheres of the second planar face 24B. The first region that only slightly adheres 35A and the first region that strongly adheres 33B are of substantially identical shape.

The first planar face 24A of the first filtration unit 15A also comprises a second region 33A that strongly adheres.

This second region 33A that strongly adheres extends at least as far as a point 43 on the common edge 37. Preferably, this region 33A that strongly adheres extends at least as far as two points 43 on the common edge 37. In the example illustrated in FIG. 3, these two points 43 are situated at the lateral ends of the edge 37.

The first region 35A that only slightly adheres and the second region 33A that strongly adheres of the first face 24A are therefore of complementary shape.

In addition, the second region that strongly adheres 33A extends opposite a second region that only slightly adheres 35B on the second face 24B.

The second region that strongly adheres 33A on the first face 24A and the second region that only slightly adheres 35B on the second face 24B are also of substantially identical shape.

The connection seal 17 is arranged between the planar faces 24 of the filtration units 15. This connection seal 17 is produced from ceramic cement, generally comprising silica and/or silicon carbide and/or aluminium nitride. After fritting, this cement has an elastic modulus of from 500 to about 5000 MPa. This cement connects the filtration units 15 to each other.

Operation of the first filtration structure according to the invention will now be described.

During a filtration phase (FIG. 1), the exhaust gases loaded with particles are guided as far as the inlet faces 21 of the filtration units 15 by the exhaust line 13. As indicated by the arrows in FIG. 2, they then penetrate into the inlet conduits 27, and pass through the walls 25 of the porous structure 19. During this passage, the soot is deposited on the walls 25 of the inlet conduits 27. This soot is deposited preferably in the region of the central axis of the particle filter 11 and towards the discharge face 23 of the filtration units 15 (on the right in the drawing).

The filtered exhaust gases escape through the discharge conduits 29 and are guided towards the silencer discharge.

When the vehicle has covered about 500 km, the loss of pressure through the filter 11 increases significantly. A regeneration phase then occurs.

In this phase, the soot is oxidised by raising the temperature of the filter 11. This oxidation is exothermic and begins in the middle and at the front of the filter. This therefore causes a temperature gradient between the front and rear areas and between the periphery and the centre of the filter.

In addition, the filtration units 15 and the seals 17 expand under the effect of the temperature. The local extent of this expansion depends on the temperature.

These variations in expansion, under the effect of temperature gradients, produce pronounced thermomechanical stresses. The presence of regions 35 that only slightly adheres allows the stresses to be released and avoids the formation of cracks in the filtration units 15 or in the connection seals 17.

Figure 4:
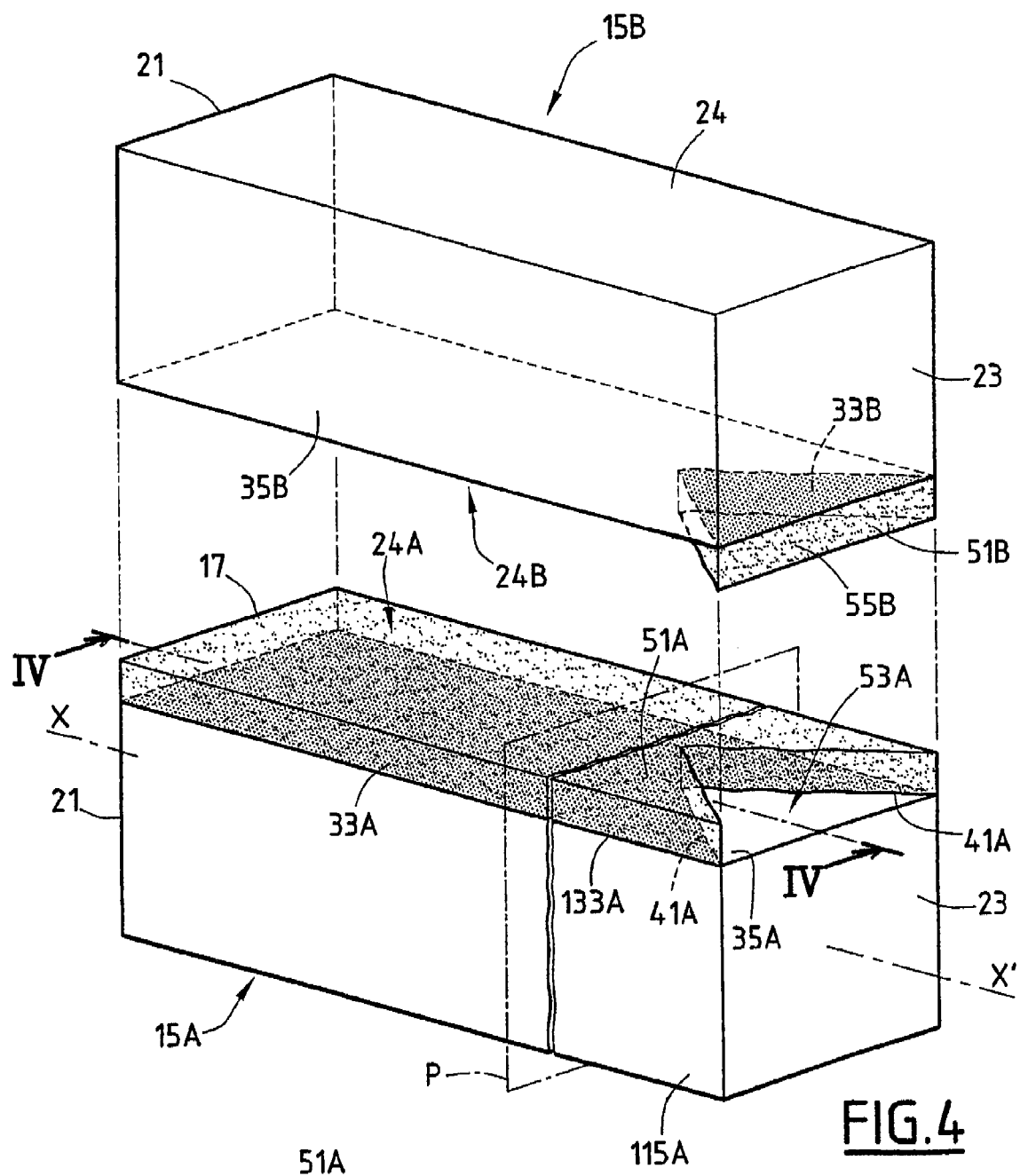
FIG. 4 is a similar view to FIG. 2, after several regeneration cycles of the filtration structure.

In addition, as illustrated in FIG. 4, if the thermomechanical stresses are too great for the structure, one of the units, for example the first unit 15A, may crack along a transverse cracking plane P, perpendicular to the axis X-X'. The cracks spread as far as the seal 17 and within this seal 17. However, the regions 35 that only slightly adheres and the regions 33 that strongly adheres are arranged in such a way that cracking occurs in preferred areas.

Thus, as illustrated in FIG. 4, the spread of cracks in the seals 17 is guided along the regions 35 that only slightly adheres on the planar faces 24 of the filtration units 15.

Figure 4A:
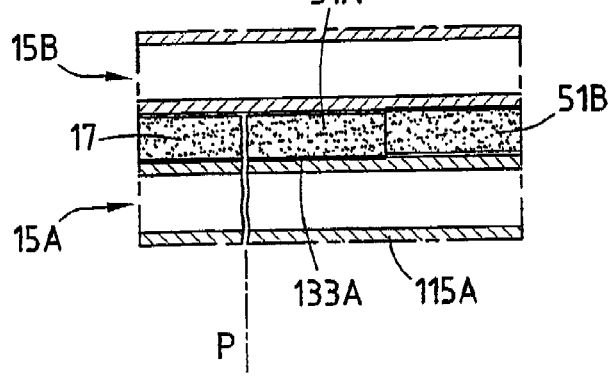
FIG. 4A is a partial view, taken in section along the plane IV-IV of FIG. 4, which is a longitudinal plane displaced in relation to the central axis of a filtering element.

Next, and as illustrated in FIGS. 4 and 4A, even if the unit 15A and the seal 17 are completely cracked in the plane P, detaching a downstream portion 115A of the unit 15A, a first portion 51A of the seal 17 remains integral with the downstream portion 115A opposite the corresponding portion 133A of the second area that strongly adheres 33A. This first portion 51A of seal 17 delimits in the downstream direction a triangular recess 53A arranged opposite the first region 35A that only slightly adheres and limited by the oblique sides 41A.

In addition, the second portion 51B of seal 17 situated opposite the first region 33B that strongly adheres of the second face 24B remains integral with the second filtration unit 15B and forms a triangular retention stop 55B, projecting in relation to this filtration unit 15B.

Thus, if a downstream portion 115A of the first filtration unit 15A, delimited by the cracking plane P and the discharge face 23, becomes detached from this unit 15A under the effect of transverse cracks inside the unit 15A and of cracks in the seal 17, this portion 115A is held by cooperation between the walls of the recess 53A, integral with the portion 115A, and the stop 55B integral with the second filtration unit 15B.

Movement of the portion 115A in the downstream direction of the filter 11 is therefore prevented, by using the divergent form of the stop 55B, whatever the longitudinal position of the cracking plane P between the inlet face 21 and the discharge face 23. The shape of the stop 55B results directly from the angle formed by the sides 41A and the common edge 37.

Figure 5:
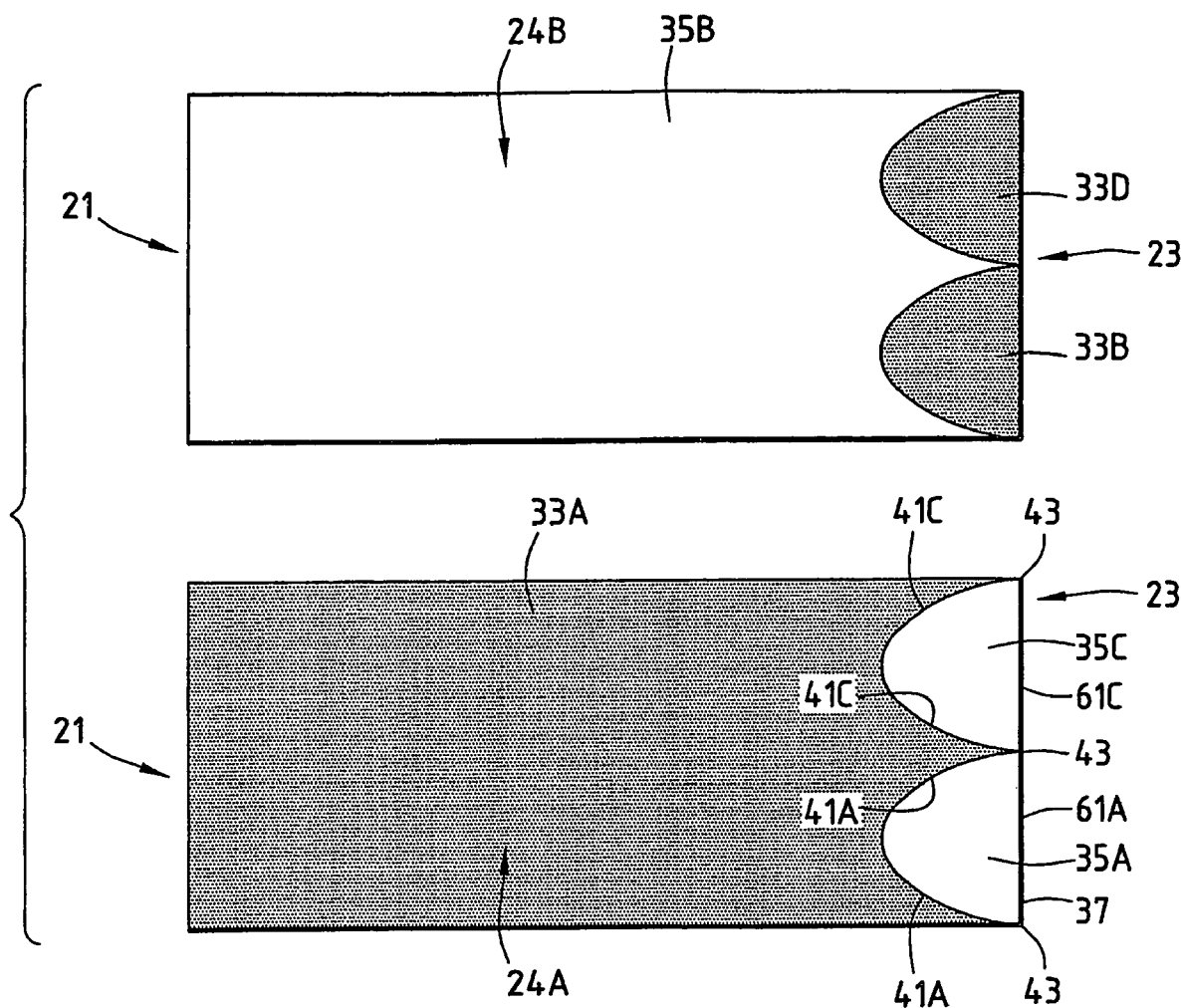
FIG. 5 is a similar view to FIG. 3, of a second filtration structure according to the invention.

In the second filtration structure illustrated in FIG. 5, the first face 24A has first and third regions 35A and 35C that only slightly adheres, delimited respectively by complementary segments 61A and 61C of the common edge 27. Each region that only slightly adheres 35A, 35C comprises two pairs of sides 41A, 41C that diverge towards the discharge face 23. As illustrated in FIG. 5, these pairs of sides 41A and 41C are curved and convex, and the two sides of each pair are connected to each other tangentially.

In addition, the first region 33A that strongly adheres of the first face 24A comprises three points of contact 43 with the common edge 27, situated at the ends of the segments 61A and 61C.

As illustrated in FIG. 5, each region 35A, 35C that only slightly adheres of the first face 24A is opposite a region 33B, 33D that strongly adheres of the second face 24B, of substantially identical shape.

Operation of this second structure according to the invention is similar to operation of the first structure. However, this structure is likely to retain any detached downstream portions of the first filtration unit 15A more effectively in the event of cracking.

Figure 6:
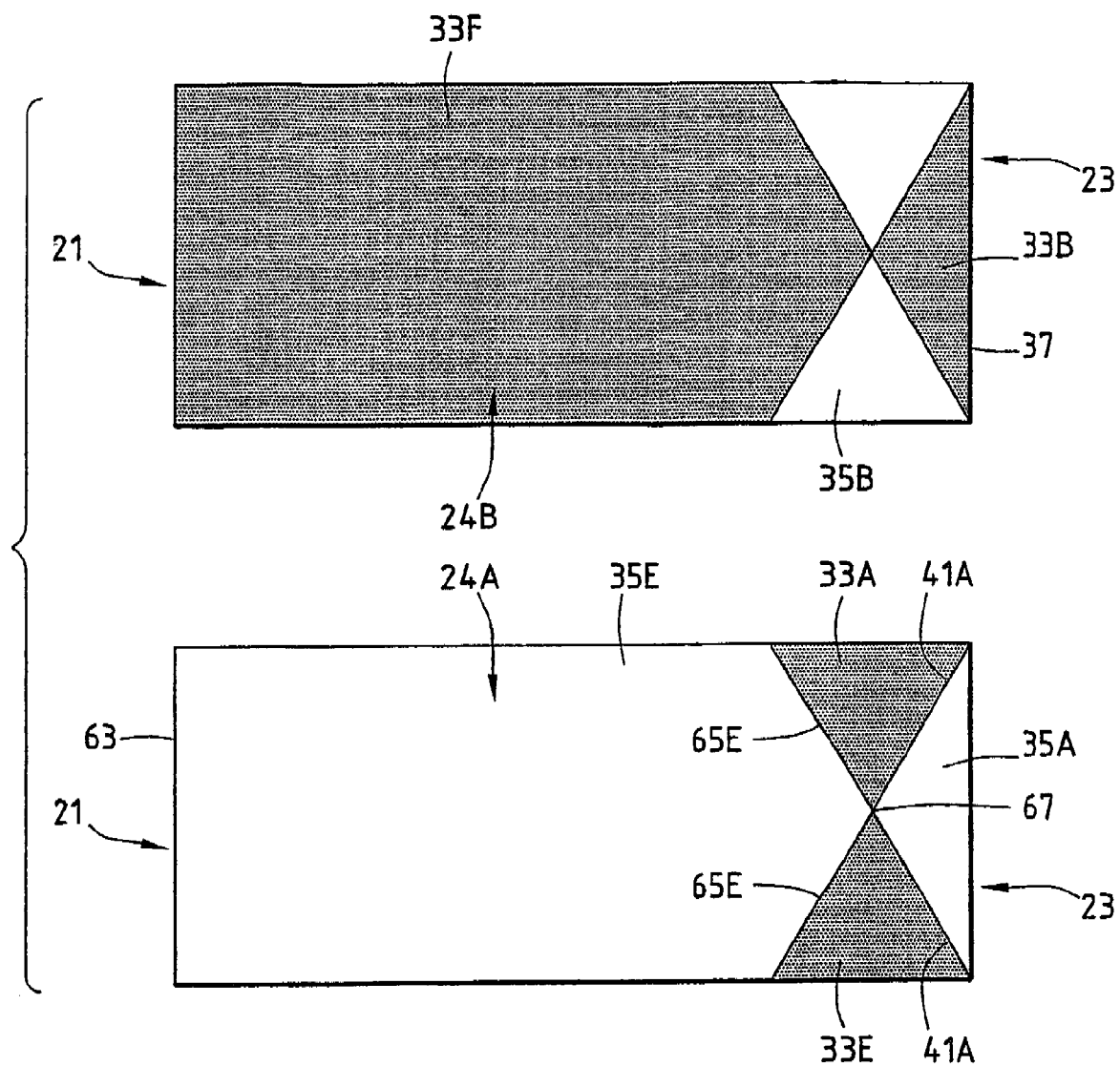
FIG. 6 is a similar view to FIG. 3 of a third filtration structure according to the invention.
Figure 7:
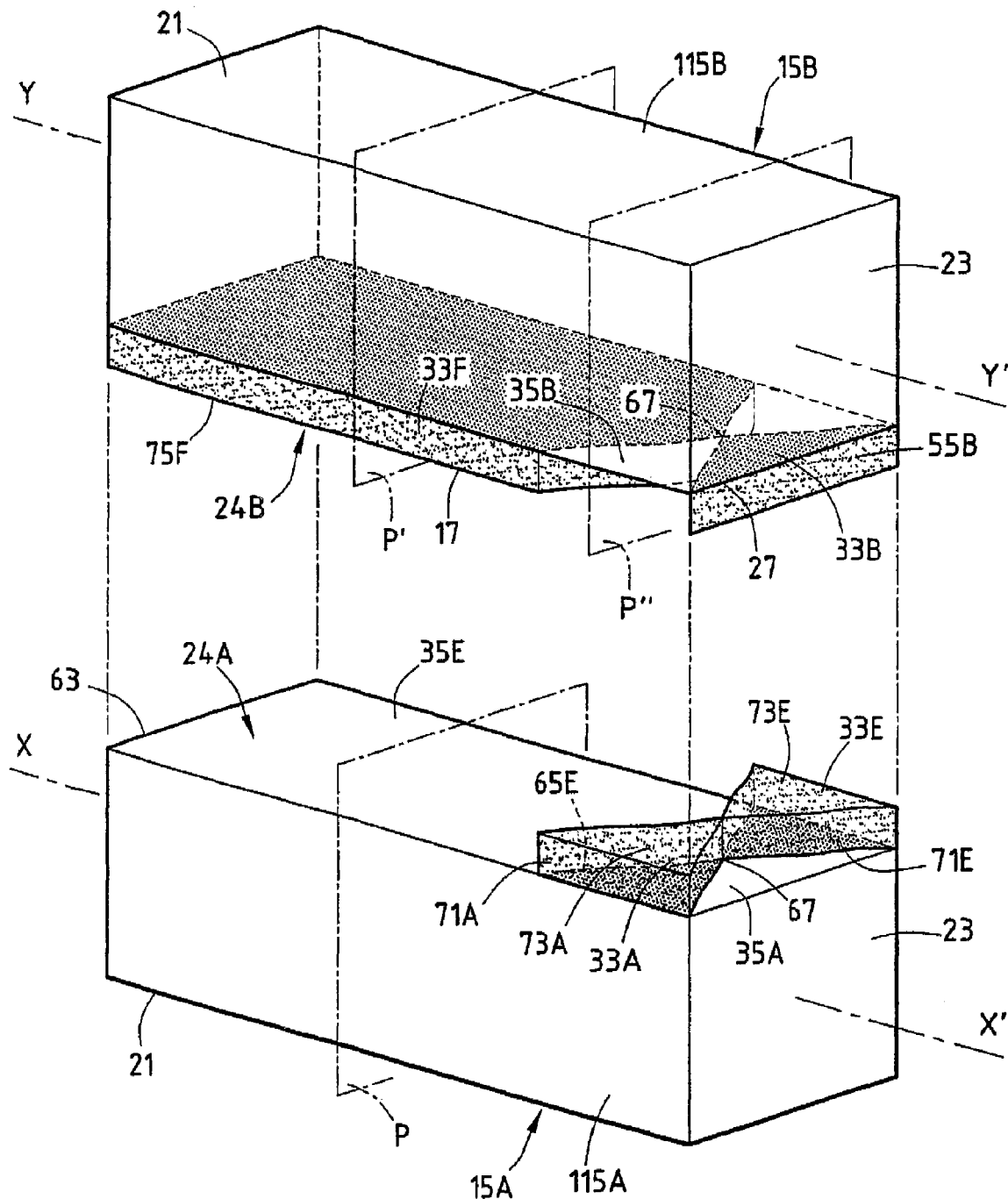
FIG. 7 is a similar view to FIG. 4 of the third filtration structure according to the invention.

A third filtration structure according to the invention is illustrated in FIGS. 6 and 7.

Unlike the first structure, the first face 24A comprises a fourth region 35E that only slightly adheres on the first face 24A, which extends between the inlet edge 63, common to the inlet face 21 and the first face 24A, and at least two lines 65E, that converge towards the discharge face 23.

The first and fourth regions 35A, 35E that only slightly adheres have a point of contact 67, at the intersection of the two convergent lines 65E of the fourth region that only slightly adheres 35E and of the two sides 41A of the first region 35A that does not adhere or only slightly adheres.

As illustrated in FIG. 6, the rest of the first face 24A forms two areas 33A and 33E that strongly adheres which are adjacent in the region of the point of contact 67.

As in the first structure, each region 35A, 35E that only slightly adheres of the first face 24A is arranged opposite a region 33B, 33F that strongly adheres on the second face 24B, of substantially identical shape.

Operation of this structure is similar to operation of the first structure for the first filtration unit. However, if there is cracking, the seal portions 71A and 71E opposite the regions that strongly adheres 33A and 33E of the first face 24A form retention stops 73A and 73E for the seal portion 75F opposite the fourth region 33F that strongly adheres of the second face 24B.

Thus, as in the first structure, the second filtration unit 15B retains, by the stop 55B, any downstream portion 115A of the first filtration unit 15A, delimited by a cracking plane P and the discharge face 23, in the event of cracking within this unit 15A.

Moreover, the first filtration unit 15A retains, by the stops 73A and 73E, any downstream portion 115B of the second filtration unit 15B, delimited, on the one hand, by any transverse cracking plane P' situated between the inlet face 21 and the plane P''' perpendicular to the longitudinal axis Y-Y' passing through the point of contact 67, and on the other hand, by the discharge face 23.

Figure 8:
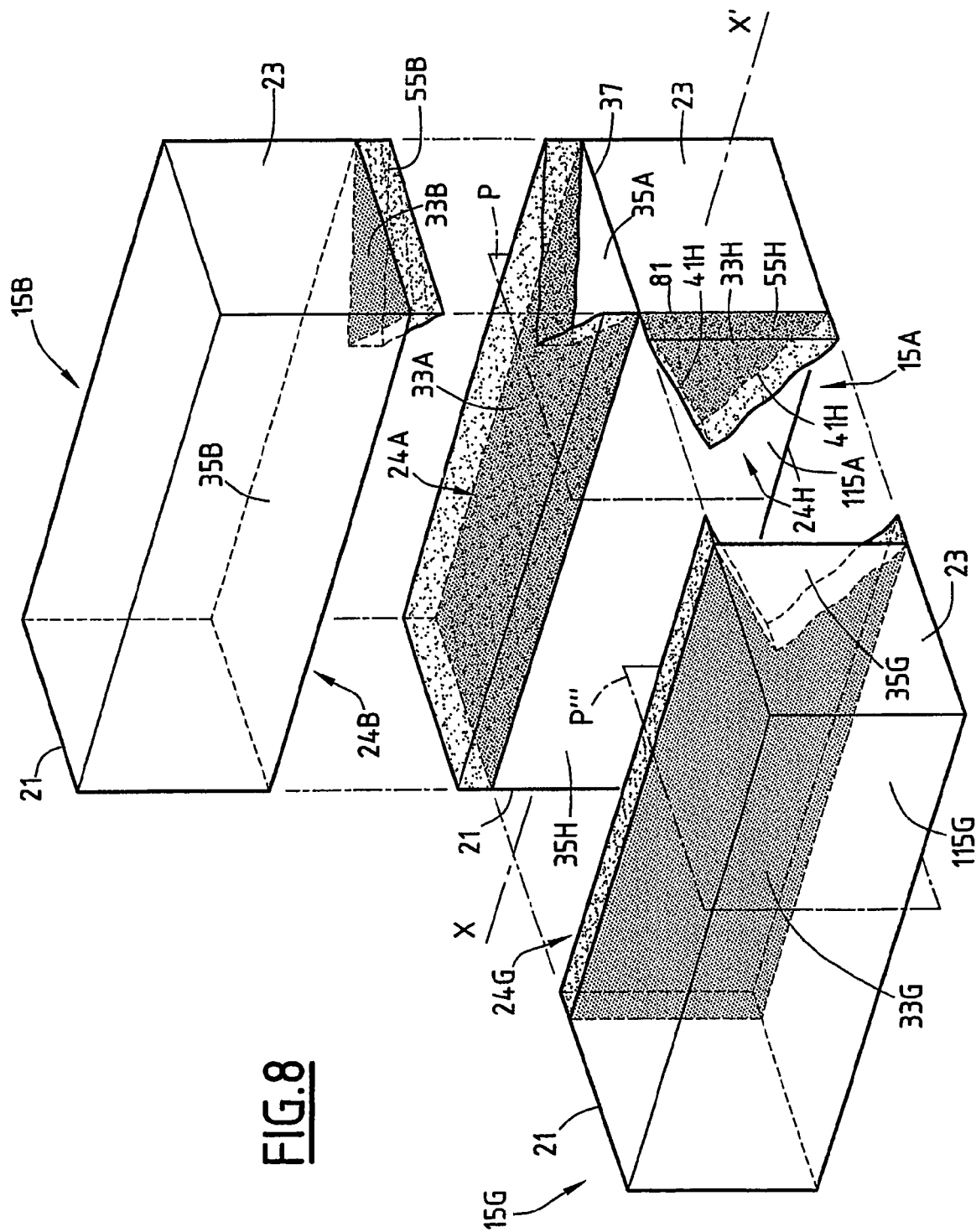
FIG. 8 is a similar view to FIG. 4 of a fourth filtration structure according to the invention.

A fourth structure according to the invention is illustrated in FIG. 8. The first filtration unit 15A (at the bottom right in the figure) has a third lateral face 24H, adjacent to the first lateral face 24A, arranged opposite a fourth lateral face 24G of a third filtration unit 15G.

As illustrated in FIG. 8, the third lateral face 24H comprises a fifth region 33H that strongly adheres, delimited by a triangle of similar shape to the triangle that delimits the first region 35A that only slightly adheres of the first face 24A.

Thus, the fifth region 33H that strongly adheres is delimited by the discharge edge 81 common to the third lateral face 24H and to the discharge face 23 and by two sides 41H that diverge towards the discharge face 23.

In addition, the rest of the third face 24H has a sixth region 35H that only slightly adheres of complementary shape to the fifth region 33H that strongly adheres.

The sixth region 35H that only slightly adheres of the third face 24H is arranged opposite a sixth region 35G that only slightly adheres of the fourth face 24G, and the fifth region 33H that strongly adheres of the third face 24H is arranged opposite a fifth region 33G that strongly adheres of the fourth face 24G, the respective shapes of these regions being substantially identical.

Operation of the fourth structure according to the invention is similar to that of the first structure. In the event of cracking, any downstream portion 115A of the first filtration unit 15A delimited by a cracking plane P and the discharge face 23 is retained by the stop 55B integral with the second filtration unit 15B. In addition, any downstream portion 115G of the third filtration unit 15G, delimited by a transverse plane P''' and the discharge face 23, is retained by the stop 55H integral with the third face 24H of the first filtration unit 15A, opposite the fifth region 33H that strongly adheres.

In the case of a filter similar to that illustrated in FIG. 1, each filtration unit 15 comprises two opposing faces 24 which have a similar structure to the first face 24A of the first filtration unit 15A illustrated in FIG. 8, and two opposing faces which have a similar structure to the third face 24H of the first filtration unit 15A illustrated in FIG. 8. Restraint of backward movement is thus provided for each of the units 15.

Figure 9:
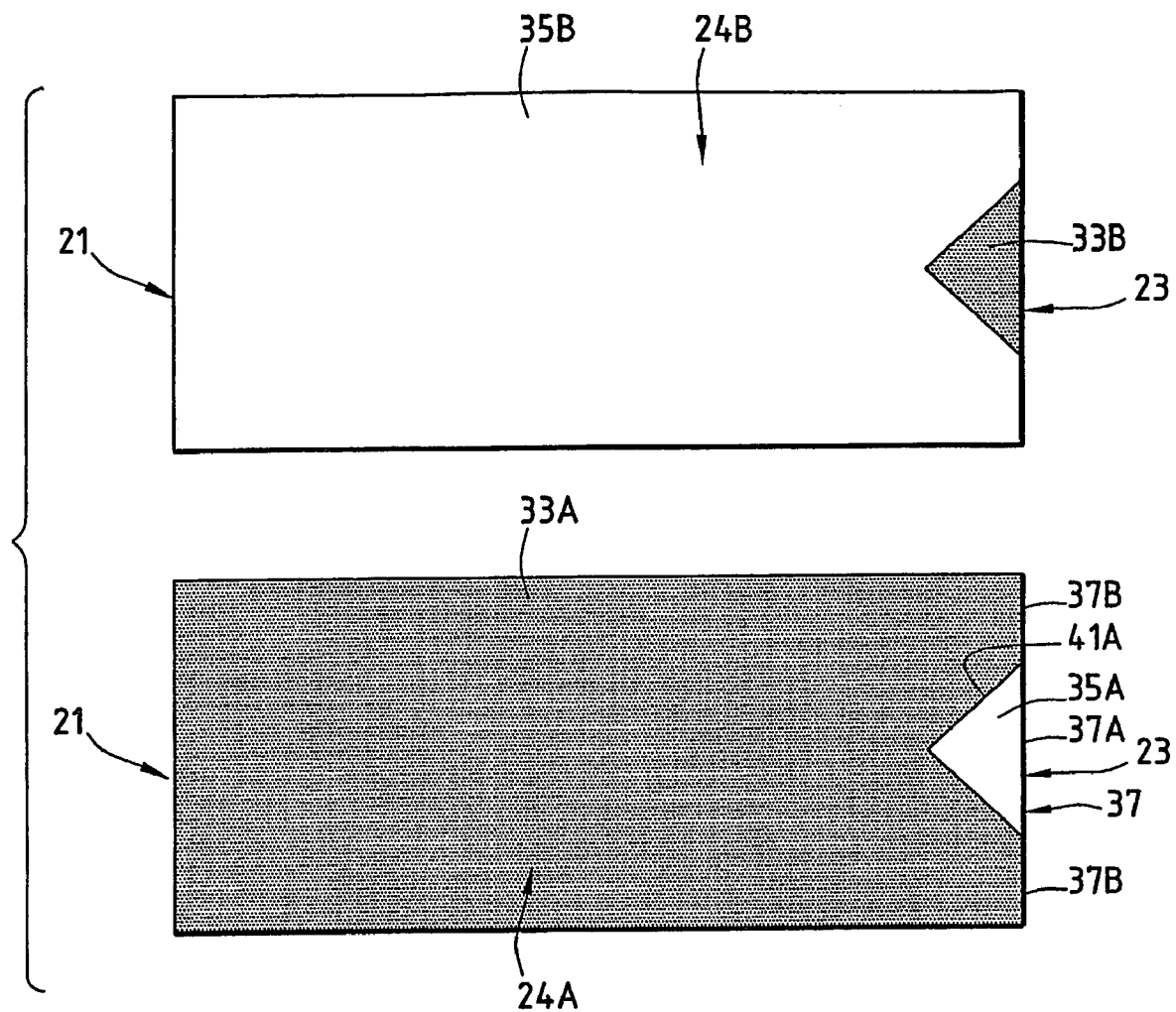
FIG. 9 is a similar view to FIG. 3 of a fifth filtration structure according to the invention.

In a fifth structure according to the invention, illustrated in FIG. 9, the first region 35A that only slightly adheres of the first face 24A extends only along a central portion 37A of the common edge 37. The second region 33A that strongly adheres of the first face 24A extends along the common edge 37 along the portions 37B complementary to this portion 37A of the common edge 37.

Figure 10:
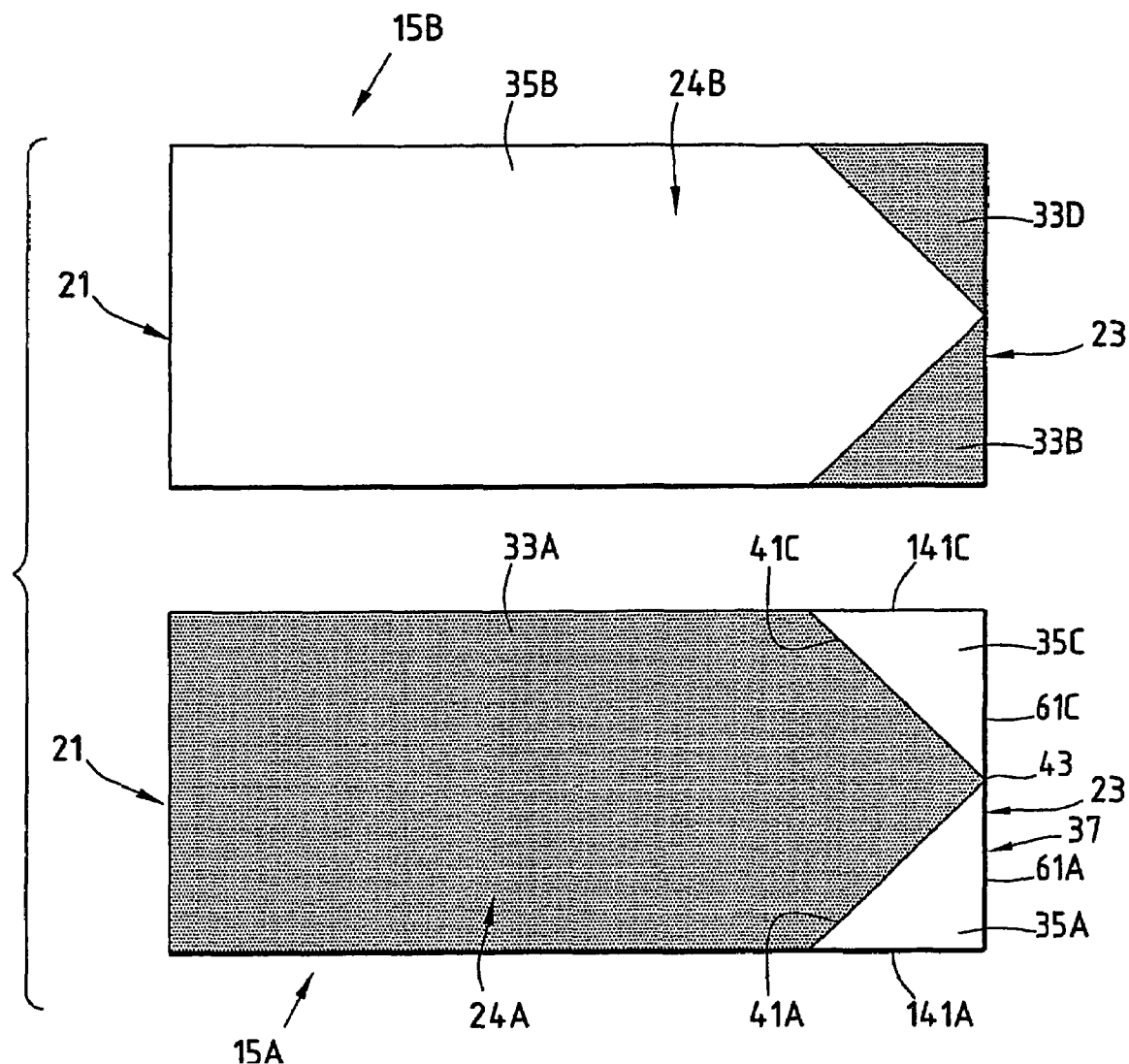
FIG. 10 is a similar view to FIG. 3 of a sixth filtration structure according to the invention.

The sixth structure according to the invention, illustrated in FIG. 10, is a variant of the second structure according to the invention (FIG. 5). Unlike the second structure, the second region 33A that does not adhere or only slightly adheres, on the first face 24A, extends as far as a single point of contact 43 with the common edge 37, situated in the middle thereof Each of the first and third regions 35A and 35C that only slightly adheres is delimited by a right-angled triangle formed by half 61A, 61C of the common edge 37, by a divergent side 41A, 41C which begins at point 43, and by a portion 141A, 141C of the lateral edge common to the first face 24A of the first unit 15A and to a lateral face of this unit 15A adjacent to the first face 24A.

By using the invention that has just been described, it is possible to have a filtration structure that can endure a multitude of regeneration phases while retaining its mechanical cohesion and impermeability to soot.

This structure allows preservation on the one hand, of mechanical cohesion between the filtering elements and on the other hand, retention of downstream portions of filtering elements that may become detached from these means.

The invention claimed is:

1. Filtration structure (11) comprising:
   at least first and second filtering elements (15A, 15B), each filtering element (15A, 15B) having an inlet face (21) and a discharge face (23), connected to each other by at least three lateral faces (24), said first and second filtering elements (15A, 15B) having respectively a first and second lateral face (24A, 24B) arranged opposite each other; and
   a seal (17) connecting said first and second lateral faces (24A, 24B) and extending between said first and second lateral faces (24A, 24B);
   the first lateral face (24A) comprising at least a first region (35A) that does not adhere, or only slightly adheres to said seal (17), and extends opposite a first region (33B) that strongly adheres to said seal (17) of the second lateral face (24B), said first region (34A) that does not adhere or only slightly adheres being delimited by at least a portion of an edge (37) common to the first lateral face (24A) and the discharge face (23);
   characterised in that, in an area adjacent to said common edge (37), the first region (35A) that does not adhere, or only slightly adheres to said seal (17) comprises at least one side (41A) that diverges towards the discharge face (23), said side (41A) extending as far as said common edge (37).

2. Structure (11) according to claim 1, characterised in that the rest of said area has, on said first lateral face (24A), a second region (33A) that strongly adheres to said seal (17), and extends as far as said common edge (37), and on said second lateral face (24B), a second region (35B) that does not adhere, or only slightly adheres to said seal (17), opposite said second region (33A) that strongly adheres to said seal (17).

3. Structure (11) according to claim 2, characterised in that an angle (α) formed by said side (41A) and said common edge (37) is less than or equal to about 50°.

4. Structure (11) according to claim 1, characterised in that said first region (35A) that does not adhere, or only slightly adheres to said seal (17) extends substantially along the whole length of said common edge (37).

5. Structure (11) according to claim 4, characterised in that said first region (35A) that does not adhere, or only slightly adheres to said seal (17) is delimited by a triangle.

6. Structure (11) according to claim 1, characterised in that the first lateral face (24A) comprises a third region (35C) that does not adhere, or only slightly adheres to said seal (17), distinct from the first region (35A) that does not adhere, or only slightly adheres to said seal (17), delimited at least in part by said common edge (37) and comprising at least one side (41C) that diverges towards the discharge face (23), this side (41C) extending as far as said common edge (37).

7. Structure (11) according to claim 6, characterised in that the first face (24A) comprises at least a fourth region (35E) that does not adhere, or only slightly adheres to said seal (17), which comprises at least one convergent side (65E), converging towards the discharge face, the convergent side (65E) extending as far as said first region (35A) that does not adhere, or only slightly adheres to said seal (17), said fourth region (35E) that does not adhere, or only slightly adheres to said seal (17) being arranged opposite a fourth region (33F) that strongly adheres to said seal (17) of the second face (24B).

8. Structure (11) according to claim 7, characterised in that the first filtering element (15A) has a third lateral face (24H), arranged opposite a fourth lateral face (24G) of a third filtering element (15G), the third lateral face (24H) comprising at least a fifth region (33H) that strongly adheres to said seal (17), delimited at least in part by a discharge edge (81) common to the third lateral face (24H) and to the discharge face (23), and in that in an area adjacent to said discharge edge (81), the fifth region (33H) that strongly adheres to said seal (17) comprises at least one side (41H) that diverges towards the discharge face (23), this side (41H) extending as far as said discharge edge (81), the fifth region (33H) that strongly adheres to said seal (17) being arranged opposite a fifth region (35G) that does not adhere, or only slightly adheres to said seal (17) on said fourth lateral face (24G).

9. Exhaust line (13),characterised in that it comprises a structure (11) according to claim 1, 10. The filter structure according to claim 1, wherein the structure is a particle filter for the exhaust gases of an internal combustion engine.

\* \* \* \* \*